Figure 3:
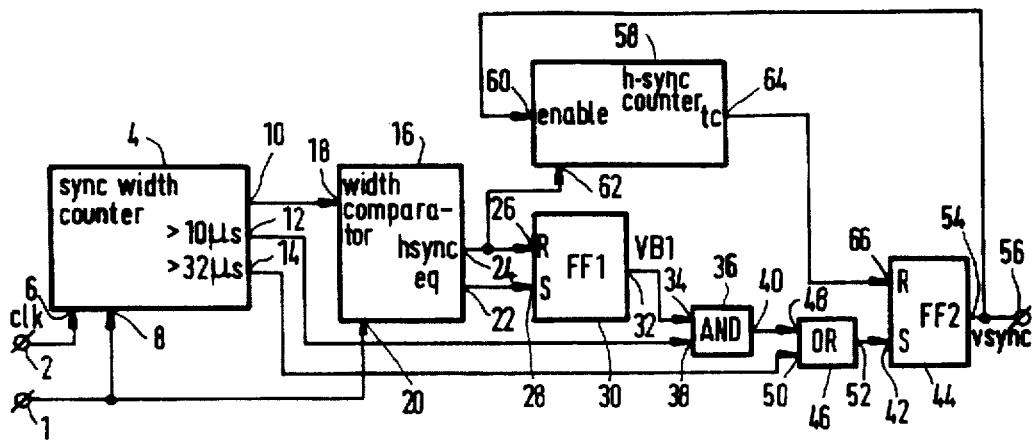

United States Patent [19]

Geerlings

[11] Patent Number: 5,784,121
[45] Date of Patent: Jul. 21, 1998

[54] VERTICAL SYNCHRONISATION SIGNAL DETECTOR

[75] Inventor: Jurgen H. T. Geerlings, Tadley, Great Britain

[73] Assignee: U.S. Philips Corporation, New York, N.Y.

[21] Appl. No.: 789,907

[22] Filed: Jan. 29, 1997

[30] Foreign Application Priority Data

Feb. 1, 1996 [EP] European Pat. Off. ............ 96200220

[51] Int. Cl.$^6$ ..................................... H04N 5/08
[52] U.S. Cl. .............................. 348/547; 348/529
[58] Field of Search ........................ 348/529, 525, 348/532, 533, 547, 548, 521, 522, 524, 526, 528, 530, 531, 534, 535; 358/154, 153, 155, 156; H04N 5/10, 5/08

[56] References Cited

U.S. PATENT DOCUMENTS

| | | | |
|---|---|---|---|
| 4,459,612 | 7/1984 | Shinkai et al. | 348/529 |
| 4,684,988 | 8/1987 | Johannes | 358/154 |
| 5,189,515 | 2/1993 | Chen | 348/533 |

FOREIGN PATENT DOCUMENTS

0454153A2 10/1991 European Pat. Off. ......... H04N 5/08

OTHER PUBLICATIONS

Patent Abstacts of Japan, vol. 18, No. 470, E–1600, abstract of JP, A, 6–153023 (Sony Corp), 31 May 1994 (May 31, 1994).

*Primary Examiner*—Chris Grant

*Attorney, Agent, or Firm*—Edward W. Goodman

[57] ABSTRACT

A vertical synchronization signal detector for detecting a vertical synchronization signal in a composite video signal. The detector comprises an input (1) for receiving the composite video signal, a first detector (4,16,22) for detecting equalization pulses occurring in the composite video signal and for generating a first detection signal upon detection of an equalization pulse, a second detector (4,16,20) for detecting horizontal sync pulses occurring in the composite video signal and for generating a second detection signal upon detection of an horizontal sync pulse, a third detector (4,12) for detecting negative going pulses occurring in the composite video signal that have a longer duration than the horizontal sync pulses and for generating a third detection pulse upon detection of such a pulse, a first signal combination unit (FF1) for generating a fourth detection signal (VBI) in response to at least one first and second detection signal generated by the first and second detector respectively, a first counter (58) for counting, when being enabled, the number of occurrences of second detection signals generated by the second detector and for generating a first control signal upon the detection of n occurrences of such second detection signals, where n is a constant integer larger than 1. Further, a second signal combination unit (AND) is provided for combining the third and fourth detection signals so as to obtain a second control signal. A third signal combination unit (FF2) receives the first control signal generated by the first counter and the second control signal from the second signal combination unit and generates in response thereto an output signal which is indicative of the occurrence of the vertical synchronization signal. The first counter is in an enabled state upon the presence of the output signal of the third signal combination unit (FF2).

10 Claims, 2 Drawing Sheets

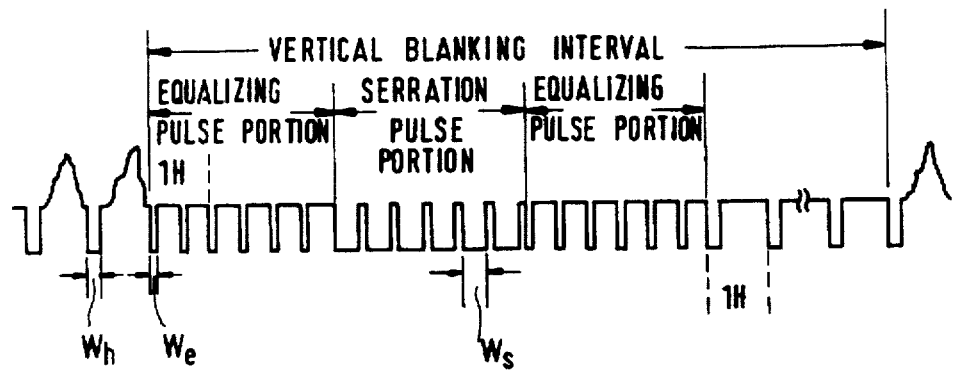
FIG.1
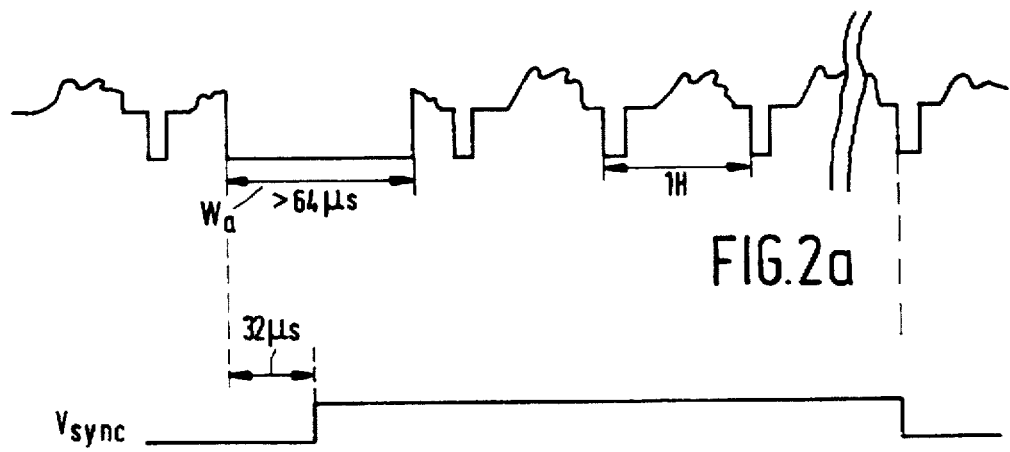
FIG.2a
FIG.2b eq hsync

VB1 vsync

VERTICAL SYNCHRONISATION SIGNAL DETECTOR

The invention relates to a vertical synchronisation signal detector for detecting a vertical synchronisation signal in a composite video signal. Such detector is known from U.S. Pat. No. 4,684,988 and can be applied in videorecorders or television apparatuses.

Vertical synchronisation signal detectors are well known in the art and can be embodied in analog and digital form. In some circumstances, the detection may lead to errors.

The invention aims at providing an improved vertical synchronisation signal detector. To that purpose, the invention proposes a vertical synchronisation signal detector for detecting a vertical synchronisation signal in a composite video signal, the detector comprises
  input means for receiving the composite video signal,
  first detector means for detecting equalisation pulses occurring in the composite video signal and for generating a first detection signal upon detection of an equalisation pulse,
  second detector means for detecting horizontal sync pulses occurring in the composite video signal and for generating a second detection signal upon detection of a horizontal sync pulse,
  third detector means for detecting pulses occurring in the composite video signal that have a longer duration than the horizontal sync pulses and for generating a third detection pulse upon detection of such a pulse,
  first signal combination means for generating a fourth detection signal (VBI) in response to at least one first and at least one second detection signal generated by the first and second detector means respectively,
  first counter means for counting, when being enabled, the number of occurrences of second detection signals generated by the second detector means and for generating a first control signal upon the detection of n occurrences of such second detection signals, where n is a constant integer equal to or larger than 1,
  second signal combination means for combining the third and fourth detection signals so as to obtain a second control signal,
  third signal combination means for receiving the first control signal generated by the first counter means and the second control signal from the second signal combination means and for generating in response thereto an output signal which is indicative of the occurrence of the vertical synchronisation signal,
  the first counter means being in an enabled state upon the presence of the output signal of the third signal combination means.

The invention is based on the recognition to make use of the different widths of the negative pulses in the vertical sync signal to detect the vertical sync signal.

The vertical synchronisation detector, wherein the vertical synchronisation signal detector is further provided with fourth detector means for detecting pulses occurring in the composite video signal that have a longer duration than half the line period of the composite video signal and for generating a fifth detection signal upon such detection, the second signal combination means being adapted to combine the third, fourth and fifth detection signals so as to obtain the second control signal has further the advantage that it is capable of detecting the artificial vertical synchronisation signals inserted by a videorecorder, when being in trick mode replay.

These and other aspect of the invention will be apparent from and elucidated with reference to embodiments described hereafter. In the following figure description shows
  FIG. 1 a timing diagram of the composite video signal at the location of the vertical blanking interval, which comprises the vertical synchronisation signal,
  FIG. 2a a timing diagram of the composite video signal comprising an artificial vertical synchronisation signal that has been inserted into the composite video signal during a trick mode replay, and FIG. 2b the output signal generated by the vertical synchronisation signal detector indicating the occurrence of such artificial vertical synchronisation signal,
  FIG. 3 an embodiment of the vertical synchronisation signal detector,
  FIG. 4a again a timing diagram of the composite video signal at the location of the vertical blanking interval, FIG. 4b the detection signal indicating the occurrence of the equalisation pulses in the equalising pulse portion, FIG. 4c the detection signal indicating the occurrence of the horizontal sync pulses, FIG. 4d the output signal of the first signal combination means and FIG. 4e the output signal generated by the vertical synchronisation signal detector indicating the occurrence of the vertical synchronisation signal.

FIG. 1 shows the composite video signal at the location of the vertical blanking interval. The vertical blanking interval continues for a 21H period, that is for the duration of 21 horizontal line periods of the composite video signal, where the line period equals roughly 64 μs. The leading 3H period of the vertical blanking interval is called an equalizing pulse portion and a serration pulse portion follows for a 3H period after the equalizing pulse portion. A second equalizing pulse portion is formed for a 3H period immediately after the serration pulse portion. Next follow a plurality of horizontal synchronisation pulses. The (negative going) horizontal synchronisation pulses have a pulse width $w_h$ of roughly 4.7 μs. The negative going pulses in the equalizing pulse portions have a pulse width $w_e$ of roughly 2.35 μs. The pulse width $w_s$ of the (negative going) serration pulses in the serration pulse portion is roughly 27.3 μs.

FIG. 2a shows the composite video signal comprising an artificial vertical synchronisation signal that has been inserted into the composite video signal by a videorecorder, during a trick mode replay. The vertical synchronisation signal is in the form of a negative going pulse having a pulse width $w_a$ which is larger than the line period H, that is: larger than 64 μs.

Figure 4A:

FIG. 3 shows an embodiment of the vertical synchronisation detector. The detector has an input terminal 1 for receiving the composite video signal and an input terminal 2 for receiving a clock signal. Preferably, the video information is first removed from the composite signal so that a composite synchronisation signal remains, comprising all the sync pulses present in the composite signal. FIG. 4a, to be discussed later, shows an example of such composite synchronisation signal.

A counter 4 is provided having a clock signal input 6 coupled to the input terminal 2 and a reset input 8 coupled to the input terminal 1. The counter 4 has a count value output 10 and at least one further output 12. In the present example, the counter 4 also has an output 14. A width comparator unit 16 is provided having an input 18 coupled to the output 10 of the counter 4 and having an enable input 20 which is coupled to the input terminal 1. The comparator unit 16 has two outputs 24 and 22 respectively which are coupled to respective inputs 26 and 28 of a flip flop 30. An output 32 of the flip flop 30 is coupled to an input 34 of an AND gate 36. The output 12 of the counter 4 is coupled to a second input 38 of the AND gate 36.

If the output 14 of the counter 4 is not available, the output 40 of the AND gate is coupled to an input 42 of a flip flop 44. If the counter is provided with the output 14, an additional OR gate 46 is present, which has its first input 48 coupled to the output 40 of the AND gate, its second input 50 coupled to the output 14 of the counter 4 and its output 52 coupled to the input 42 of the flip flop 44. The flip flop 44 has an output 54 which is coupled to an output terminal 56.

A second counter 58 is provided having an enable input 60 coupled to the output 54 of the flip flop 44, a count input 62 coupled to the output 20 of the comparator 16 and an output 64 which is coupled to a second input 66 of the flip flop 44.

Figure 4B:
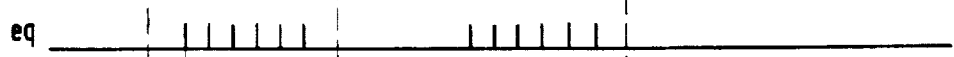
Figure 4C:

The functioning of the detector of FIG. 3 will be explained using the timing diagrams shown in the FIGS. 4a to 4d. The composite synchronisation signal shown in FIG. 4a is supplied to the input terminal 1 of the detector. Each negative going edge in the signal results in resetting the counter 4 via its input 8 to a zero count value. The counter starts counting with a count rate given by the frequency of the clock signal received via the clock input 6. This frequency must be high enough to 'measure' the widths of the negative going pulses in the composite synchronisation signal with a sufficient accuracy. The frequency could be chosen equal to 13.5 MHz, as an example. A positive going edge in the composite synchronisation signal enables the comparator 16 via its input 20. In response to this enabling, the comparator compares the count value received via its input 18 with count value information that have a relationship with the required width of the horizontal synchronisation pulses and the equalisation pulses. If a comparison carried out in the comparator 16 results in a conclusion that a count value supplied by the counter 4 corresponds to the required width of a horizontal synchronisation pulse, a pulse is generated at the output 24. If a comparison carried out in the comparator 16 results in a conclusion that a count value supplied by the counter 4 corresponds to the required width of a equalisation pulse, a pulse is generated at the output 22. FIG. 4b shows the generation of the detection pulses at the output 22 of the comparator 16, in response to the equalisation pulses occurring in the composite synchronisation signal of FIG. 4a. FIG. 4c shows the generation of the detection pulses occurring at the output 24 of the comparator 16 in response to the horizontal sync pulses occurring in the composite synchronisation signal of FIG. 4a.

Figure 4D:

In the present example, the flip flop 30 generates a VBI pulse, see FIG. 4d, in response to the occurrence of the first equalisation pulse in the first equalizing pulse portion directly after the last horizontal sync pulse. The VBI pulse at the output 32 of the flip flop 30 indicates the occurrence of the vertical blanking interval. It is not strictly necessary to generate the VBI pulse upon the occurrence of the first equalisation pulse in the first equalizing pulse portion. One could generate the VBI pulse upon the detection of two or more equalisation pulses so as to improve the detection accuracy.

Upon the occurrence of the first serration pulse in the serration pulse portion, the output 12 of the counter 4 generates a control signal, in the form of a logical 'high' or '1' signal, 10 μs after the occurrence of the negative going edge of the first serration pulse. As a result, the output of the AND gate 36 and thus the output of the OR gate 46 changes from a logical 'low' or '0' signal to a logical 'high' or '1' signal. This change of the signal at the input 42 of the flip flop 44 sets the flip flop 44, so that its output 54 changes to a logical 'high' signal, see FIG. 4e, which is an indication that a vertical sync signal has occurred.

In the present example, the flip flop 44 is set upon the occurrence of the first serration pulse in the serration pulse portion. In another embodiment, one could have added a counter (not shown) in the line coupling the output 12 to the second input 38 of the AND gate 36. This counter could add the number of subsequent serration pulses in the serration pulse portion and generate a 'low'-to-'high' transition upon counting two or more serration pulses in the serration pulse portion.

Figure 4E:

The 'low'-to-'high' transition in the output signal of the flip flop 44 enables the counter 58 to count the subsequent horizontal sync pulses occurring after the second equalizing pulse portion. Upon counting n horizontal sync pulses, where n is 6 in the present example, the counter 58 generates a reset signal at its output 64, which reset signal is supplied to the reset input of the flip flop 44 and resets the flip flop 44. As a result, the output signal at the output 54 changes from 'high' to 'low', as can be seen in FIG. 4e.

FIG. 2a shows an artificial vertical synchronisation pulse added to the composite video signal. Upon the negative going edge of this pulse, the counter 4 is reset and starts counting the width of the pulse. At the time instant 32 μs after the occurrence of the negative going edge, the counter 4 generates a detection signal at its output 14 by changing its logical state from 'low' to 'high'. This results in setting the flip flop 44, so that an output signal as given in FIG. 2b is generated at the output 54 of the flip flop 44. Upon having counted n horizontal sync pulses by the counter 58, the output signal at the output 54 changes from 'high' to 'low' again, as shown in FIG. 2b.

Whilst the present invention has been described with respect to preferred embodiments thereof, it is to be understood that these are not limitative examples. Thus, various modifications may become apparent to those skilled in the art, without departing from the scope of the invention, as defined in the appended claims. As an example, the detection of the serration pulses is realized by detecting pulses have a pulse width longer than 10 μs. One could, however, have detected the serration pulses by counting the exact length of the pulse and comparing the count value of the counter 4 with a count value corresponding to the exact width of a serration pulse. In the same way, one could have detected the artificial vertical synchronisation pulse by counting the length of the pulse and comparing the count value with a count value corresponding to the exact width of the artificial pulse. Further, the invention lies in each and every novel feature or combination of features as herein disclosed.

I claim:

1. A vertical synchronization signal detector for detecting a vertical synchronization signal in a composite video signal, the detector comprises input means for receiving the composite video signal, first detector means for detecting equalization pulses occurring in the composite video signal and for generating a first detection signal upon detection of an equalization pulse, second detector means for detecting horizontal sync pulses occurring in the composite video signal and for generating a second detection signal upon detection of a horizontal sync pulse, third detector means for detecting pulses occurring in the composite video signal that have a longer duration than the horizontal sync pulses and for generating a third detection signal upon detection of such a pulse.

first signal combination means for generating a fourth detection signal (VBI) in response to at least one first and at least one second detection signal generated by the first and second detector means respectively, first counter means for counting, when being enabled, the number of occurrences of second detection signals generated by the second detector means and for generating a first control signal upon the detection of n occurrences of such second detection signals, where n is a constant integer equal to or larger than 1, second signal combination means for combining the third and fourth detection signals so as to obtain a second control signal, third signal combination means for receiving the first control signal generated by the first counter means and the second control signal from the second signal combination means and for generating in response thereto an output signal which is indicative of the occurrence of the vertical synchronization signal, the first counter means being in an enabled state upon the presence of the output signal of the third signal combination means.

2. The vertical synchronization signal detector as claimed in claim 1, wherein second counter means are present for generating count values representative of the widths of pulses occurring in the composite video signal, the first detector means being adapted to detect whether a count value generated by the second counter means is such that the count value substantially corresponds to the width of an equalization pulse present in the composite video signal and for supplying the first detection signal in response to such detection, the second detector means being adapted to detect whether a count value generated by the second counter means is such that the count value substantially corresponds to the width of an H-sync pulse present in the composite video signal and for supplying the second detection signal in response to such detection, the third detector means being adapted to detect whether a count value generated by the second counter means is substantially larger than the count value corresponding to the pulse width of an H-sync pulse and for generating the third detection signal upon such detection.

3. The vertical synchronization signal detector as claimed in claim 1, wherein the first signal combination means are in the form of a set-reset flip flop, the first detection signal being a set signal for the set-reset flip flop, the second detection signal being a reset signal for the set-reset flip flop.

4. The vertical synchronization signal detector as claimed in claim 3, wherein the third signal combination means are in the form of a second set-reset flip flop, the second control signal being a set signal for the second flip flop and the first control signal being a reset signal for the second flip flop.

5. The vertical synchronization signal detector as claimed in claim 1, further provided with fourth detector means for detecting pulses occurring in the composite video signal that have a longer duration than half the line period of the composite video signal and for generating a fifth detection signal upon such detection, the second signal combination means being adapted to combine the third, fourth and fifth detection signals so as to obtain the second control signal.

6. The vertical synchronization signal detector as claimed in claim 5, the fourth detector means being adapted to detect whether a count value generated by the second counter means is larger than the count value corresponding to half the line period of the composite video signal and for generating the fifth detection signal upon such detection.

7. The vertical synchronization signal detector as claimed in claim 1, wherein the second signal combination means comprise an AND gate for combining the third and fourth detection signals.

8. The vertical synchronization signal detector as claimed in claim 5, wherein the second signal combination means comprise an AND gate for combining the third and fourth detection signals so as to obtain a combination signal and an OR gate for combining the fifth detection signal and the combination signal so as to obtain the second control signal.

9. Videorecorder provided with the vertical synchronization signal detector as claimed in claim 1.

10. Videorecorder apparatus provided with the vertical synchronization signal detector as claimed in claim 1.

* * * * *